UNITED STATES PATENT OFFICE.

ERNEST A. WILDMAN, OF INDIANAPOLIS, INDIANA, ASSIGNOR TO PARKE DAVIS & COMPANY, OF DETROIT, MICHIGAN, A CORPORATION.

ALKAMIN ESTERS OF AMINO-TOLUIC ACIDS AND OTHER SIMILAR COMPOUNDS OF SAID ACIDS.

1,317,251.   Specification of Letters Patent.   Patented Sept. 30, 1919.

No Drawing.   Application filed July 29, 1918.   Serial No. 247,319.

*To all whom it may concern:*

Be it known that I, ERNEST A. WILDMAN, a citizen of the United States, residing at Indianapolis, Marion county, and State of Indiana, have invented and discovered certain new and useful Improvements in Alkamin Esters of Amino-Toluic Acids and other Similar Compounds of Said Acids, of which the following is a specification.

My invention relates to alkamin esters of amino-toluic acids.

The object of the invention is the production of synthetic substances having the property of producing local anæsthesia, while at the same time being characterized by their small degree of irritation when applied to the tissues and also by a lower toxicity than any other of the substances commonly used as local anæsthetics.

The invention broadly stated, may be said to consist of anæsthetic compounds derived from di-substituted benzoic acids in which the essential substituents are the atomic aggroupments —$NH_2$ and —$CH_3$. Such di-substituted benzoic acids may be represented by substantially the formula:

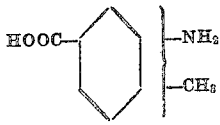

in which the —$NH_2$ and $CH_3$ radicals may be located in any positions in the benzene ring. I am aware that Stolz, *et al.*, U. S. Patent 820,830, May 15, 1906, discloses certain derivatives of alkylated aminobenzoic acids which are, however, mono-substituted benzoic acids having only one nuclear hydrogen atom replaced by a radical which may be represented by the formula:

in which R is an alkyl group and $R_1$ may be either an alkyl group or a hydrogen atom. I wish expressly to make clear that my invention covers compounds in which the amino group itself contains no alkyl substituents, and in which any two nuclear hydrogen atoms in the benzoic acid constituent are replaced by the group —$NH_2$ and the alkyl radical —$CH_3$, forming an entirely different series of compounds from those of Stolz, *et al.*, as will be readily appreciated by one versed in structural chemistry.

Specific embodiments of the invention are alkamin esters of amino-toluic acids and salts thereof as represented by substantially the following formula:

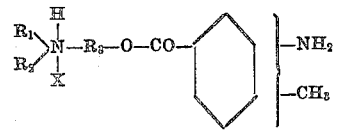

in which $R_3$ is any bivalent hydrocarbon radical, $R_1$ and $R_2$ are alkyl radicals which may be alike or different, and X is a halogen atom, the —$NH_2$ and —$CH_3$ groups being situated in any positions in the benzene ring.

The alkamin esters of the amino-toluic acids are colorless, solids or viscous oils solidifying at low temperatures, as a rule readily soluble in the usual organic solvents, such as ether, alcohol, acetone, and benzene; only slightly soluble in water and such solution having an alkaline reaction to litmus. On heating with mineral acids or alkalis, the alkamin esters are hydrolyzed with the formation of an alkamin and amino-toluic acid. The alkamin esters form salts with one equivalent of an acid, which salts are soluble in water with a neutral reaction.

A specific example of the alkamin esters belonging to this series is the diethylaminoethanol ester of ortho-amino-para-toluic acid having the formula:

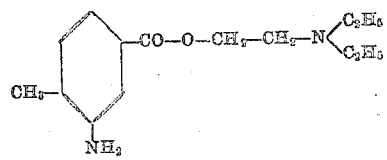

which may be prepared as follows: Equal molecular proportions of ortho-nitro-paratoluyl chlorid and diethylaminoethanol are mixed upon which they react according to the equation:

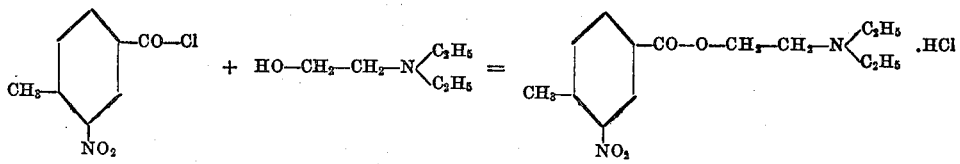

forming the hydrochlorid of the diethylaminoethanol ester of ortho-nitro-para-toluic acid as indicated. Ten parts by weight of the latter substance are dissolved in a mixture of twenty-five parts by weight of hydrochloric acid (sp. gr. 1.2) and twenty parts by weight of alcohol, and the solution treated with twelve parts by weight of granulated tin, keeping the temperature at about 35° C.

The reaction progresses rapidly and is complete when there is no further tendency to warm itself spontaneously. A colorless solution is obtained from which the tin is removed by precipitation with hydrogen sulfid. On addition of sodium carbonate solution, the diethylaminoethanol ester of ortho-amino-para-toluic acid separates as an oil. When treated with one equivalent of hydrochloric acid it forms a hydrochlorid which is readily soluble in water with a neutral reaction and crystallizes from a mixture of absolute alcohol and ether in colorless crystals melting at 157–8° C.

Another specific example of the alkamin esters belonging to this series is the diethylaminoethanol ester of para-amino-ortho-toluic acid which may be prepared in a manner analogous to that previously stated, that is, by the reduction of the diethylaminoethanol ester of para-nitro-ortho-toluic acid, which may be prepared by the reaction occurring when equal molecular proportions of para-nitro-ortho-toluyl chlorid and diethylaminoethanol are mixed. The diethylaminoethanol ester of para-amino-orthotoluic acid is precipitated from the reaction mixture as a colorless oil after the removal of the tin. When treated with one equivalent of hydrochloric acid it forms a hydrochlorid which is readily soluble in water with a neutral reaction and crystallizes from a mixture of absolute alcohol and ether in colorless crystals melting at 139–40° C.

In an analogous manner other alkamin esters of other amino-toluic acids and other salts of said esters may be obtained.

Having thus described my invention, what I claim is:—

1. Alkamin esters of di-substituted benzoic acids in which the essential substituents —$NH_2$ and —$CH_3$ may be located in any positions in the benzene ring.

2. Alkamin esters of amino-toluic acids.

3. The products represented by substantially the following formula:

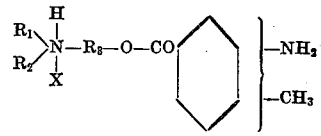

in which $R_3$ is any bivalent hydrocarbon radical, $R_1$ and $R_2$ are alkyl radicals which may be alike or different, and X is an acid anion, the —$NH_2$ and —$CH_3$ groups being situated in any position in the benzene ring.

4. As new porducts, the alkamin esters of ortho-amino-para-toluic acid, being colorless compounds, solids or viscous oils solidifying at low temperatures, as a rule readily soluble in the usual organic solvents, slightly soluble in water with an alkaline reaction to litmus, decomposed when heated with acids or alkalis with formation of an alkamin and ortho-amino-para-toluic acid, forming salts soluble in water with a neutral reaction which produces anæsthesia with a relatively small degree of irritating or toxic action.

5. As a new product, the diethylaminoethanol ester of ortho - amino - para - toluic acid, being a colorless oil, readily soluble in the usual organic solvents, slightly soluble in water with an alkaline reaction to litmus, decomposed when heated with hydrochloric acid or sodium hydroxid, into diethylaminoethanol and ortho-amino-para-toluic acid, forming a salt with one equivalent of hydrochloric acid which crystallizes from a mixture of absolute alcohol and ether in colorless crystal melting at 157–8° centigrade and forms aqueous solutions of neutral reaction which produce local anæsthesia with a relatively small degree of irritating or toxic action.

In witness whereof I have hereunto set my hand and seal at Indianapolis this 8th day of July, A. D. nineteen hundred and eighteen.

ERNEST A. WILDMAN. [L. S.]

Witnesses:
 HAROLD GRAY,
 ARTHUR L. WALTERS.